United States Patent
Batiste et al.

(10) Patent No.: US 9,545,586 B1
(45) Date of Patent: Jan. 17, 2017

(54) METHOD OF REPLACING FILTER MEDIA

(71) Applicant: Puronics, Incorporated, Livermore, CA (US)

(72) Inventors: Scott A. Batiste, Danville, CA (US); John S. Gulliford, Livermore, CA (US)

(73) Assignee: Puronics, Incorporated, Livermore, CA (US)

( * ) Notice: Subject to any disclaimer, the term of this patent is extended or adjusted under 35 U.S.C. 154(b) by 0 days.

(21) Appl. No.: 14/823,847

(22) Filed: Aug. 11, 2015

Related U.S. Application Data

(62) Division of application No. 12/571,276, filed on Sep. 30, 2009, now abandoned.

(60) Provisional application No. 61/101,604, filed on Sep. 30, 2008.

(51) Int. Cl.
*B01D 24/10* (2006.01)
*B01D 24/46* (2006.01)
*C02F 1/00* (2006.01)

(52) U.S. Cl.
CPC .......... *B01D 24/4631* (2013.01); *B01D 24/10* (2013.01); *C02F 1/003* (2013.01)

(58) Field of Classification Search
CPC ......... B01D 15/02; B01D 23/14; B01D 24/10; B01D 24/4631; C02F 1/003; C02F 1/004; C02F 1/281; C02F 1/283; C02F 1/288; C02F 2303/14
See application file for complete search history.

(56) References Cited

U.S. PATENT DOCUMENTS

| | | | |
|---|---|---|---|
| 2,057,237 A | 10/1936 | Hoop | |
| 3,169,110 A | 2/1965 | Rudelick | |
| 3,951,811 A | 4/1976 | Casolo et al. | |
| 4,305,826 A * | 12/1981 | Moses | B01J 39/02 210/290 |
| 4,717,476 A | 1/1988 | Scott | |
| 5,007,994 A | 4/1991 | Snee | |
| 5,271,837 A | 12/1993 | Discepolo et al. | |
| 5,407,573 A | 4/1995 | Hughes | |
| 5,628,899 A | 5/1997 | Vaughan | |
| 5,635,062 A | 6/1997 | Cameron et al. | |
| 5,816,290 A | 10/1998 | Altshuler | |
| 5,919,373 A | 7/1999 | Naaktgeboren | |
| 2004/0159596 A1 | 8/2004 | Mitchell et al. | |
| 2005/0279696 A1 | 12/2005 | Bahm et al. | |
| 2006/0175262 A1 * | 8/2006 | Martin | B01D 15/00 210/670 |

* cited by examiner

*Primary Examiner* — Matthew O Savage
(74) *Attorney, Agent, or Firm* — Silicon Valley Patent Group LLP

(57) ABSTRACT

A water filtration system includes a housing with a valve having an inlet and an outlet. A filter media bed within the housing includes four filter media including silver impregnated activated carbon; coconut carbon or copper zinc; calcium carbonate, magnesium oxide, garnet and silica sand; and gravel. The filter media bed is configured to provide a desired flow rate, e.g., of 10 g/m @ 15 psi. The filter media bed may include 3-9% of the first filter medium, 40-60% of the second filter medium, 12-23% of the third filter medium and 20-30% of the fourth filter medium or less. Additionally, the valve may include a drain line port through which the less dense filter media can be flushed from the housing and new filter media provided into the housing without the need to physically uninstall or replace the system.

16 Claims, 1 Drawing Sheet

METHOD OF REPLACING FILTER MEDIA

CROSS-REFERENCE TO RELATED APPLICATIONS

This application is a divisional of U.S. application Ser. No. 12/571,276, filed Sep. 30, 2009, entitled "Water Filtration System," which, in turn, claims the benefit of U.S. Provisional Application No. 61/101,604, filed Sep. 30, 2008, entitled "Water Filtration System," both of which are incorporated herein by reference in their entireties.

FIELD OF THE INVENTION

The present invention is related to a water filtration system and more particularly a filtration system that removes chemicals, solids and other contaminates from municipally treated water.

BACKGROUND

Water filters, purifiers and conditioners are well known. There is a continuing desire to clean water that is supplied to households, e.g., by municipalities, as evidenced by the demand for bottled water as well as the variety of water filtration devices that are used with tap water. Water provided by municipalities typically include contaminants such as particulate solid material, e.g., sand, chips of various metal oxides and the like, and chemicals, e.g., principally chlorine or other chemicals used in the municipal purification process but including as well such chemicals as carbonates usually associated with "hard" water. The removal of the solid contaminates is typically effected by filtration. Chemical contaminates in tap water are typically removed using media that includes sodium and/or potassium salts, which many consider undesirable from an environmental perspective.

Moreover, after a period of service all filtration systems require servicing, such as cleaning and reconditioning. In conventional home filtration systems, servicing typically entails removal of the system, which can be time consuming and cumbersome.

Thus, what is desired is a water filtration system that is environmentally friendly and that can be easily serviced when required.

SUMMARY

A water filtration system, in accordance with one embodiment of the present invention, includes a housing with a valve having an inlet and an outlet and a filter media bed within the housing that includes four filter media including silver impregnated activated carbon; coconut carbon or copper zinc; calcium carbonate, magnesium oxide, garnet and silica sand; and gravel. The filter media bed is configured to provide a desired flow rate, e.g., of 5-15 g/m @ 15 psi. In one embodiment, the filter media bed includes 3-9% of the first filter medium, 40-60% of the second filter medium, 12-23% of the third filter medium and 20-30% of the fourth filter medium or less. Additionally, the valve may include a drain line port through which the less dense filter media, i.e., the silver impregnated activated carbon and the coconut carbon or copper zinc, can be flushed from the housing and new filter media provided into the housing without the need to physically uninstall or replace the system.

DETAILED DESCRIPTION

Figure 1:
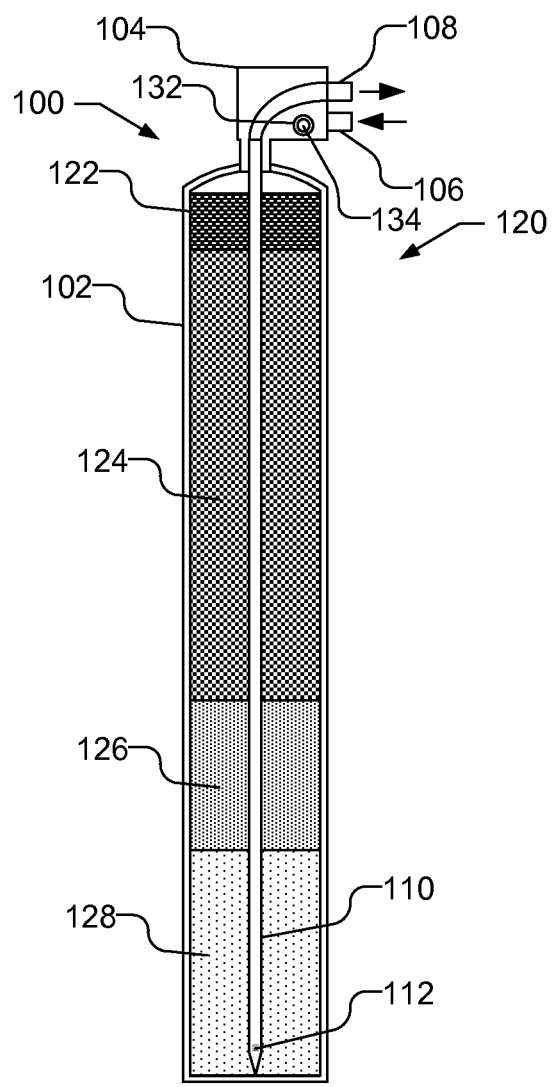
FIG. 1 illustrates a cross-sectional view of a water filter system in accordance with one embodiment of the present invention.

FIG. 1 illustrates a cross-sectional view of a water filter system 100 in accordance with one embodiment of the present invention. The water filtration system 100 includes a housing 102, which may be, e.g., a food grade 316L stainless steel tank. The housing may have a diameter of 10 inch and a height of 48 inch. If desired, other dimensions and materials may be used to produce the housing 102, including material such as fiberglass. A valve 104 is located at one end of the housing 102. The valve 104 may be the type described in U.S. Pat. Nos. 5,816,290; 5,628,899; and 5,919,373, all of which are incorporated herein in their entirety by reference. In one embodiment, the valve 104 may be the model WS1 Control Valve Assembly manufactured by Clack Corporation or other similar model. The valve 104 includes an inlet 106, through which water is introduced into the housing 102, and an outlet 108, through which filtered water is removed from the housing 102. In one embodiment, the filter system 100 is located between the municipal water supply and the user's house, so that the municipal water enters the housing 102 via inlet 104 and the filtered water is provided to the user's house via outlet 108.

The inlet 106 of the valve 104 is fluidically coupled to the inside of the housing 102. Additionally, the outlet 108 of the valve 104 is fluidically coupled to a distributor tube 110. The distributor tube 110 extends through the inside of the housing 102 and includes apertures or slits 112 that are located near the bottom of the housing 102, as illustrated in FIG. 1. The inside of the housing 102 further includes a combination of filter media bed 120. Thus, in operation, water enters the inside of the housing 102 via inlet 106, is filtered by the filter media bed 120, enters the distributor tube 110 via slits 112 and exits the valve 104 through the outlet 108.

The filter media bed 120 includes a four filter media 122, 124, 126, and 128, respectively. The first media 122 may be a low density, wood based silver impregnated granular activated carbon that inhibits bacteria growth within the filter media bed 120. The silver (% wt) is approximately 1% to 1.1% and the density is 0.256-0.318 g/cc. In one embodiment, a product such as Hygiene produced by Puronics, Incorporated may be used. The second filter medium 124 may be a copper zinc material or a low density coconut activated carbon that reduces or eliminates chemicals and chemical tastes, such as chlorine. The density of the second filter medium 124 is 0.46 g/cc or greater. In one embodiment, a product such as KDF® 55 produced by KDF® Fluid Treatment or Purifex™ produced by Puronics, Incorporated may be used as the second filter medium 124. The third filter medium 126 is a high density filter material, such as calcium carbonate, otherwise known as Calcite, magnesium oxide, garnet, or silica sand, which removes suspended solids as small as 5 μm. By way of example, the third filter medium 126 has a density of approximately 2 g/cc. In one embodiment, a product such as Corosex® produced by Clack Corp., or Altapure™ produced by Puronics, Incorporated may be used as the third filter medium 126. The fourth filter medium 128 is another high density material, such as gravel, which polishes the water. The fourth filter medium 128 may have a density of approximately 2 g/cc. In one particular embodiment, the four filter media 122, 124, 126, and 128 may be wood based silver impregnated granular activated carbon, a low density coconut activated carbon, calcium carbonate, and gravel, respectively. In another embodiment, the four filter media 122, 124, 126, and 128 may be wood based silver impregnated granular activated carbon, a low density coconut activated carbon, garnet, and gravel, respectively. In yet another embodiment, the four filter media 122, 124, 126, and 128 may be wood based silver impregnated granular activated carbon, a low density coconut activated carbon, silica sand, and gravel, respectively.

Due to the differences in the density, the different filter media in the filter media bed 120 remain separate within the housing 102. In one embodiment, the ratios of the different filter media in the media bed 120 provides a flow rate of 5-15 g/m @ 15 psi, and more specifically 10 g/m @ 15 psi. By way of example, the filter media bed may include 3-9% of the first filter medium 122, 40-60% of the second filter medium, 12-23% of the third filter medium and 20-30% of the fourth filter medium. More specifically, the filter media bed 120 may include 5-7% of the first filter medium 122, 45-55% of the second filter medium, 15-20% of the third filter medium and 22-28% of the fourth filter medium. Even more specifically, the filter media bed 120 may include 6% of the first filter medium 122, 51% of the second filter medium, 17% of the third filter medium and 26% of the fourth filter medium.

With above combinations of filter media 122, 124, 126, and 128 in the filter media bed 120, the desired flow rate may be achieved, which is suitable for a typically household, while effectively filtering and conditioning the water without resorting to the use of sodium or potassium salts.

Additionally, from time to time, it may be necessary to service and replace at least some of the filter media. Because the filter media have different densities the filter media stay effectively separated within the housing 102. Moreover, because the first filter medium 122 of silver impregnated carbon has the lowest density and the second filter medium 124 of, e.g., coconut carbon, has the next lowest density, these filter media remain near the top of the housing 102 near the valve 104.

Figure 2:
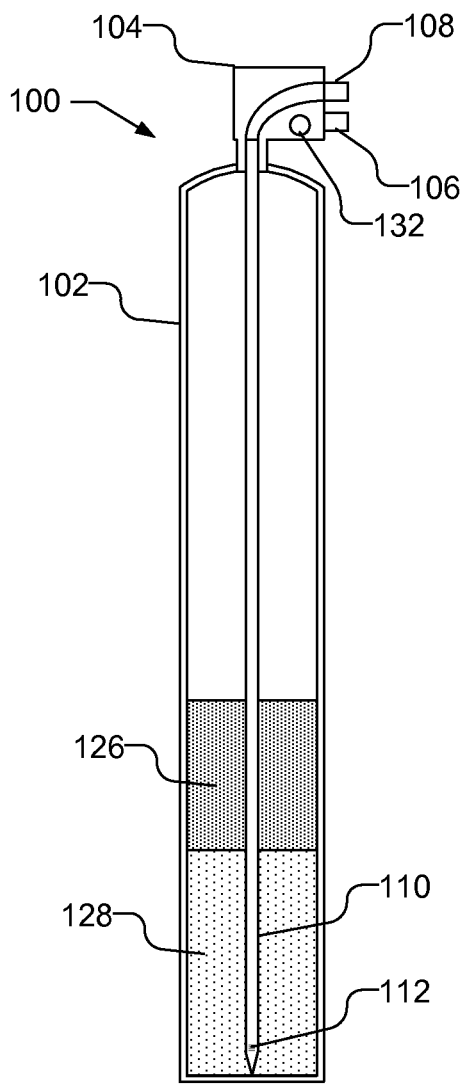
FIG. 2 illustrates a cross-sectional view of the water filter system from FIG. 1 after the first two filter media has been removed in accordance with another embodiment of the present invention.

As illustrated in FIG. 1, valve 104 further includes a drain line port 132 that is coupled to a drain and is fluidically coupled to the inside of the housing 102. The drain line port 132 includes a drain line flow control 134 that limits the amount of water that is back flushed through the system, which is typically done on a daily basis. After disconnecting the drain line port 132 from the drain and removing the drain line flow control 134, the system may be back flushed through the drain line port 132 so that water will flush the first filter medium 122 up and out of the housing 102 through valve 104 and the drain line port 132. With additional back flushing, the second filter medium 124 will also be flushed out of the housing 102 through valve 104 and the drain line port 132 as illustrated in FIG. 2, without flushing the third filter medium 126 and the fourth filter medium 128. Replacement filter media for the first filter medium 122 and the second filter medium 124 may be added back to the housing 102 through the drain line port 132. It may be desirable to replace both the first filter medium 122 and second filter medium 124 together, but in some embodiments, only the first filter medium 122 may be replaced, e.g., if the first filter medium 122 needs to be replaced more frequently. Once the filter media is replaced, the drain line flow control 134 may be replaced returning the filter system 100 to that shown in FIG. 1. Accordingly, the filtration system 100 need not be replaced or physically uninstalled during maintenance.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of replacing filter media within a water filtration system that includes a housing that contains four filter media, wherein a first filter medium is less dense than a second filter medium, the second filter medium is less dense than a third filter medium; and the third filter medium is less dense than a fourth filter medium, the method comprising:
    disconnecting a drain line port from a drain to provide access to the four filter media in the housing and removing a drain line flow control from the drain line port;
    providing water into the housing to back flush the first filter medium and the second filter medium out of the housing through the drain line port without flushing the third filter medium and the fourth filter medium out of the housing;
    providing a new second filter medium and a new first filter medium into the housing through the drain line port;
    replacing the drain line flow control; and
    connecting the drain line port to the drain.

2. The method of claim 1, wherein the first filter medium is silver impregnated activated carbon and the second filter medium is at least one of coconut carbon and copper zinc.

3. The method of claim 2, wherein the third filter medium comprises at least one of calcium carbonate, magnesium oxide, garnet and silica sand, and the fourth filter medium comprises gravel.

4. The method of claim 2, wherein the four filter media by weight is comprised of 3-9% of the first filter medium, 40-60% of the second filter medium.

5. The method of claim 2, wherein the four filter media by weight is comprised of 5-7% of the first filter medium, 45-55% of the second filter medium.

6. The method of claim 2, wherein the four filter media has a flow rate of 5-15 g/m @ 15 psi.

7. The method of claim 1, wherein providing water into the housing provides water into the housing through a distributor tube that has apertures near the bottom of the housing, the water flows through the apertures into the four filter media in the housing.

8. A method of replacing filter media within a water filtration system that includes a housing that contains a plurality of filter media, each filter medium in the plurality of filter media having a different density, the method comprising:
    disconnecting a drain line port from a drain to provide access to the plurality of filter media in the housing and removing a drain line flow control from the drain line port;
    providing water into the housing to back flush a first filter medium out of the housing through the drain line port without flushing other filter media out of the housing;
    providing a new first filter medium into the housing through the drain line port;
    replacing the drain line flow control; and
    connecting the drain line port to the drain.

9. The method of claim 8, wherein providing water into the housing back flushes the first filter medium out of the housing through the drain line port without flushing any other filter media in the plurality of filter media out of the housing.

10. The method of claim 8, wherein providing water into the housing additionally back flushes a second filter medium out of the housing through the drain line port without flushing the other filter media out of the housing, the method further comprising providing a new second filter medium into the housing through the drain line port before replacing the drain line flow control.

11. The method of claim 8, wherein providing water into the housing provides water into the housing through a distributor tube that has apertures near the bottom of the housing, the water flows through the apertures into the plurality of filter media in the housing.

12. The method of claim 8, wherein the first filter medium is silver impregnated activated carbon and a second filter medium in the plurality of filter media is at least one of coconut carbon and copper zinc.

13. The method of claim 12, wherein a third filter medium in the plurality of filter media comprises at least one of calcium carbonate, magnesium oxide, garnet and silica sand, and a fourth filter medium in the plurality of filter media comprises gravel.

14. The method of claim 13, wherein the plurality of filter media has a flow rate of 5-15 g/m @ 15 psi.

15. The method of claim 12, wherein the plurality of filter media by weight is comprised of 3-9% of the first filter medium, 40-60% of the second filter medium.

16. The method of claim 12, wherein the plurality of filter media by weight is comprised of 5-7% of the first filter medium, 45-55% of the second filter medium.

* * * * *